United States Patent
Moffatt et al.

(10) Patent No.: US 7,435,291 B2
(45) Date of Patent: *Oct. 14, 2008

(54) AMINE- AND PHTHALOCYANINE DYE-CONTAINING INK-JET INKS WITH IMPROVED OZONE FASTNESS

(76) Inventors: John R. Moffatt, 1000 NE. Circle Blvd., Corvallis, OR (US) 97330-4200; Linda C. Uhlir-Tsang, 1000 NE. Circle Blvd., Corvallis, OR (US) 97330-4200; Joseph W. Tsang, 1000 NE. Circle Blvd., Corvallis, OR (US) 97330-4200

( * ) Notice: Subject to any disclaimer, the term of this patent is extended or adjusted under 35 U.S.C. 154(b) by 240 days.

This patent is subject to a terminal disclaimer.

(21) Appl. No.: 11/080,209

(22) Filed: Mar. 14, 2005

(65) Prior Publication Data

US 2006/0201383 A1 Sep. 14, 2006

(51) Int. Cl.
*C09D 11/02* (2006.01)

(52) U.S. Cl. .............. 106/31.43; 106/31.49; 106/31.47; 106/31.46

(58) Field of Classification Search .............. 106/31.43, 106/31.49, 31.47, 31.46
See application file for complete search history.

(56) References Cited

U.S. PATENT DOCUMENTS

| | | | |
|---|---|---|---|
| 7,052,535 B2 * | 5/2006 | Uhlir-Tsang et al. | 106/31.27 |
| 7,083,671 B2 * | 8/2006 | Uhlir-Tsang et al. | 106/31.58 |
| 2003/0079650 A1 | 5/2003 | Prasad et al. | |
| 2004/0114014 A1 | 6/2004 | Sato et al. | |
| 2004/0194661 A1 | 10/2004 | Taguchi et al. | |
| 2005/0025914 A1 * | 2/2005 | Uhlir-Tsang et al. | 428/32.34 |
| 2005/0025915 A1 * | 2/2005 | Uhlir-Tsang et al. | 428/32.34 |
| 2006/0152569 A1 * | 7/2006 | Jinnou et al. | 347/105 |
| 2007/0095250 A1 * | 5/2007 | Uhlir-Tsang et al. | 106/31.27 |
| 2007/0098927 A1 * | 5/2007 | Uhlir-Tsang et al. | 106/31.27 |

FOREIGN PATENT DOCUMENTS

| | | |
|---|---|---|
| EP | 1 308 489 A | 5/2003 |
| EP | 1 405 883 A | 4/2004 |
| EP | 1 616 918 A | 1/2006 |

* cited by examiner

*Primary Examiner*—Helene Klemanski

(57) ABSTRACT

In accordance with embodiments of the present invention, an ink-jet ink can comprise a metallized phthalocyanine dye and a liquid vehicle carrying the dye. The liquid vehicle can include an amine additive present in the ink-jet ink at an effective concentration to cause improvement of ozone fastness. The improvement can be determined by comparing the ozone fastness of the ink-jet ink with a control ink-jet ink that does not include the amine additive.

38 Claims, No Drawings

AMINE- AND PHTHALOCYANINE DYE-CONTAINING INK-JET INKS WITH IMPROVED OZONE FASTNESS

FIELD OF THE INVENTION

The present invention relates generally to amine-containing ink-jet inks. More particularly, the present invention relates to ink-jet inks having improved ozone fastness when printed on photo media, such as semi-metal oxide or metal oxide-containing porous media.

BACKGROUND OF THE INVENTION

In ink-jet technology, image quality of high-resolution images can be a function of both the ink-jet ink used to produce an image, and the print medium upon which the image is printed. Desirable attributes of print quality include saturated colors, high gloss and gloss uniformity, and freedom of grain and coalescence, among other characteristics.

Once a high-resolution image is printed, however, another major issue arises, namely, image permanence relating to how long the quality of the image will last. As the photo industry continues to move from film to digital imaging methods, the issue of image permanence becomes more important.

With respect to much of the print media currently on the market, printed images commonly have undesirable attributes in the area of image permanence. One such undesirable attribute is the gradual dye-fade observed when dye-based ink-jet inks are printed on porous media. Such fade has been shown to be caused by air, and more particularly, by small amounts of ozone in the air. It appears that, over time, ozone reacts with many dyes commonly used in ink-jet inks, thus causing them to break down and to lose or diminish their intended color properties. It should be noted that dye-fade is more of a problem with certain dyes than with others. For example, cyan dyes tend to be affected to a greater extent by the presence of ozone in the air than do other dyes.

Along with dye-fade, another significant undesirable attribute is color-shift. It has been observed that when ozone reacts with some dyes, the intended color properties of a given dye may shift to another wavelength value along the visible spectrum. This effect causes a gradual change in the perceived colors of the printed image from what was originally intended by the dyes.

Both of these undesirable attributes, dye-fade and color-shift, gradually modify the perception of the printed image. Because the printed image is susceptible to these significant changes over time, many have been reluctant, especially in the graphics arts and photography industries, to embrace ink-jet printing of images intended to last for a significant period of time.

As such, it would be beneficial to develop ink-jet inks that can be printed photo media, e.g., semi-metal oxide or metal oxide-containing porous media, while minimizing the affects of exposure to atmospheric ozone.

SUMMARY OF THE INVENTION

It has been recognized that it would be advantageous to improve ozone fastness by including certain additives in ink-jet inks. In accordance with this, an ink-jet ink that typically meets this criterion can comprise an ozone fastness enhancing amine. More specifically, the present invention is drawn to an ink-jet ink comprising a metallized phthalocyanine dye and a liquid vehicle carrying the dye. The liquid vehicle can include an amine additive present in the ink-jet ink at an effective concentration to cause improvement of ozone fastness. The improvement can be determined by comparing the ozone fastness of the ink-jet ink with a control ink-jet ink that does not include the amine additive.

In another embodiment, a printing system for creating images with improved ozone fastness can comprise a printing medium including an ink-receiving layer coated thereon and an ink-jet ink. The ink-receiving layer of the printing medium can include semi-metal oxide or metal oxide particulates. The ink-jet ink can be configured for printing on printing medium, and can comprise a metallized phthalocyanine dye and a liquid vehicle carrying the dye. The liquid vehicle can include an amine additive that is present in the ink-jet ink at an effective concentration to cause improvement of ozone fastness performance, wherein the improvement is determined by comparing the ozone fastness of the ink-jet ink with a control ink-jet ink that does not include the amine additive.

In another embodiment, a method for printing images with improved ozone fastness can comprise jetting an ink-jet ink onto a printing medium. The printing medium can include an ink-receiving layer coated thereon comprising semi-metal oxide or metal oxide particulates. The ink-jet ink can comprise a metallized phthalocyanine dye and a liquid vehicle carrying the dye. The liquid vehicle can include an amine additive that is present in the ink-jet ink at an effective concentration to cause improvement of ozone fastness performance, wherein the improvement is determined by comparing the ozone fastness of the ink-jet ink with a control ink-jet ink that does not include the amine additive.

Additional features and advantages of the invention will be apparent from the following detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, plasticizers, and/or co-solvents in certain embodiments.

The term "metallized" when referring to the phthalocyanine dyes includes dyes that have a transition metal that is chelated, coordinated, or complexed to the dye molecule as an integral part of the dye structure. Metallized dyes do not include dyes that merely include a metal counter ion. For example, DB199Na is a copper phthalocyanine dye having a sodium counter ion. The copper component makes this particular dye a "metallized" dye, whereas the sodium counter ion does not.

The term "control ink-jet ink" refers to ink-jet inks that are prepared in order to determine whether there is an improvement in ozone fastness for amine-containing inks prepared in accordance with embodiments of the present invention. Typically, a control ink-jet ink is prepared by duplicating an amine additive-containing ink, except for the replacement of the amine additive with an equivalent amount of water. Thus, for each ink-jet ink of the present invention, the control ink-jet ink is relative to the specific ink-jet ink it is to be tested against. Typically, the control ink-jet ink is tested against the amine-containing ink-jet ink for ozone fastness by printing both inks identically on a media substrate (such as porous media or other coated media) and testing the printed images in an ozone chamber at a controlled ozone concentration, relative humidity, and temperature. Failure of each printed sample can be defined as a predetermined percentage OD loss. If the printed sample prepared using the control ink fails prior to the amine additive-containing inkjet ink, then the amine additive is said to have improved ozone fastness. For example, in one embodiment, the comparing of ozone fastness of an amine-containing ink-jet ink with a control ink-jet ink can be carried out by several steps. These steps include: a) preparing a first printed sample including the ink-jet ink printed on a media substrate (such as commercially available porous media, for example, Epson Premium Glossy Photo Paper); b) preparing a second printed sample including the control ink-jet ink printed on the media substrate so that the second printed sample is substantially identical to the first printed sample; c) placing the first printed sample and the second printed sample in a chamber having a 1 ppm ozone level by volume, a relative humidity of 50%, and a temperature of 30° C.; and d) comparing time intervals required for each of the first printed sample and the second printed sample to reach failure in the chamber. In this embodiment, failure can be determined by 30% optical density loss compared to initial optical density. Thus, a longer time interval to failure of the first printed sample relative to the time interval to failure of the second printed sample indicates improvement in ozone fastness.

The term "effective concentration" when referring to an amount of the amine additive that can be used to improve of ozone fastness, amounts that cause the amine additive-containing ink-jet ink to outperform a control ink-jet ink are included. In other words, certain amine additives will work to improve ozone fastness within a concentration range or at other specific levels, and will not improve ozone fastness at other levels. Thus, an effective concentration of an amine additive to improve ozone fastness includes any functional amount of that amine additive, or combination of amine additives, that may be present in an ink-jet ink which improves ozone fastness.

The term "associated" when referring to an interaction between the metallized phthalocyanine dye and the amine additive can include any number of molecular associations, but is associated to a greater degree than mere admixture or contact. For example, an amine additive can be molecularly associated with a metallized phthalocyanine dye in the form of a van der Waal force or ionic attraction. Further, the association can occur in the ink-jet ink and/or once the ink-jet ink is printed on a media substrate. However, preferably, the association will at least be present once the inkjet ink has been printed or applied to the media substrate, as it is on the media substrate where ozone fastness becomes an issue. Examples of associations include covalent bonding, hydrogen bonding, or ionic attraction, such as by complexation, chelation, or salt formation. Alternatively, association can be characterized by intercalation or other general attraction.

The term "solubilizing moieties" refers to groups, such as acidic groups, that can be attached to organic compositions in order to improve their solubility in the ink vehicle. Examples include sulfonic acid groups, carboxylic acid groups, quaternary amines, etc.

The term "about" when referring to a numerical value or range is intended to encompass the values resulting from experimental error that can occur when taking measurements.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, an ink-jet ink composition can comprise a metallized phthalocyanine dye and a liquid vehicle carrying the dye. The liquid vehicle can include an amine additive present in the ink-jet ink at an effective concentration to cause improvement of ozone fastness performance. Improvement can be determined by comparing the ozone fastness performance of the ink-jet ink which contains the amine additive to that of a control ink-jet ink that does not include the amine additive.

In another embodiment, a printing system for creating images with improved ozone fastness can comprise a printing medium including an ink-receiving layer coated thereon and an ink-jet ink. The ink-receiving layer of the printing medium can include semi-metal oxide or metal oxide particulates. The ink-jet ink can be configured for printing on printing medium, and can comprise a metallized phthalocyanine dye and a liquid vehicle carrying the dye. The liquid vehicle can include an amine additive present in the ink-jet ink at an effective concentration to cause improvement of ozone fastness performance, wherein the improvement is determined by comparing the ozone fastness of the ink-jet ink with a control ink-jet ink that does not include the amine additive.

In another embodiment, a method for printing images with improved ozone fastness can comprise jetting an ink-jet ink onto a printing medium. The printing medium can include an ink-receiving layer coated thereon comprising semi-metal oxide or metal oxide particulates. The ink-jet ink can comprise a metallized phthalocyanine dye and a liquid vehicle carrying the dye. The liquid vehicle can include an amine additive present in the ink-jet ink at an effective concentration to cause improvement of ozone fastness performance, wherein the improvement is determined by comparing the ozone fastness of the ink-jet ink with a control ink-jet ink that does not include the amine additive.

With respect to each of the composition, system, and method described herein, in two preferred embodiments, the amine additive can be a polyamine additive or a heterocyclic amine additive. Polyamines include amines that have from two to about 20 amine groups in one embodiment, and from two to about 10 amines in an alternative embodiment. In still a further embodiment, the polyamines can have from two to about five amines. Further, with respect to heterocyclic amine additives, heterocyclic amines devoid of oxygen within its ring structure exemplify a particular group of materials that provide desirable results, though this observation is not intended to be limiting.

Ink-jet Ink Composition

In accordance with embodiments of the present invention, it has been discovered that certain amine compositions, such as polyamines, heterocyclic mines, and other types of amines, can improve ozone fastness of ink-jet inks, particularly when printed on porous media substrates such as semi-metal oxide or metal oxide coated media substrates. The amines used can come in a variety of forms, including in the form of a primary amines, secondary amines, tertiary amines, and heterocyclic aliphatic amines. The amines typically contain 20 carbons or less, and may contain oxygen, phosphorous, or sulfur. These additives are particularly useful when added to metallized dye-containing ink-jet inks, such as copper- or nickel-containing dyes. One class of dyes that can be used includes phthalocyanine dyes. Application of an inkjet ink to a media substrate in accordance with embodiments of the present invention can be by thermal or piezo ink-jet application processes.

In accordance with embodiments of the present invention, the amine additive can be present in the ink-jet ink composition at an effective concentration to improve ozone fastness compared to a control ink-jet ink that does not include the amine additive. Typically, this concentration can be from 0.01 wt % to 10 wt %. Additionally, the metallized phthalocyanine dye can be present in the ink-jet ink composition at from 0.01 wt % to 10 wt %, though these ranges are not intended to be limiting. This being stated, ranges should be determined on a case by case basis, depending on vehicle components, specific metallized phthalocyanine dye, and/or specific amine additive selected for use, as would be ascertainable by one skilled in the art after considering the present disclosure. Some specific amine additives may actually have a more narrow functional range, and other may have a broader functional range. As a result, specific examples of amine additives described herein that show a lack of ozone fastness improvement at a specific amount or which show reduced ozone fastness in a particular ink are not necessarily excluded from the present invention, as they may be effective in other inks or at other concentrations at reducing ozone fade.

Exemplary amine compositions that can be used include N-methyl-1,3-propanediamine, 1,10-phenanthroline, diethylenetriamine, triethyleneamine, N,N-diethylethylenediamine, homopiperazine, piperazine, piperidine, piperazine-2-carboxylic acid dihydrochloride, 4-piperidineethanol, 1-(2-hydroxyethyl)piperidine, 1,8-bis-[dimethylamino] naphthalene (proton sponge), N-(2-hydroxyethyl)piperazine-N'-(2 ethane sulfonic acid) sodium salt (HEPES), 4-(2-hydroxyethyl)piperazine-1-propane sulfonic acid (EPPS), and combinations thereof. This list is not intended to be exhaustive, but merely provides an exemplary list of compositions that have been tested and shown to improve ozone fastness at at least one concentration. As can be seen from the above list, each of these amine compositions that are effective for use are polyamines, heterocyclic amines that do not include oxygen within the ring, or both. Further, in one embodiment, when using a heterocyclic amine additives, saturated ring structures often perform better than unsaturated ring structures. This being stated, provided the amine additive is effective at reducing ozone fade, such additives are included in accordance with embodiments of the present invention. Further, other amine(s) can also be used, provided the amine(s) are used in a concentration that improves ozone fastness compared to inkjet inks prepared identically except for the removal of the amine additive and the replacement of the removed amine additive with water. As an example of another type of amine additive that can be used that is outside of these specific classes, glycine or other amino acids can also be included in certain ink-jet inks with improved ozone fastness.

As mentioned, the ink-jet ink compositions of the present invention are typically prepared in an aqueous formulation or liquid vehicle which can include water, co-solvents, surfactants, buffering agents, biocides, sequestering agents, viscosity modifiers, humectants, and/or other known additives. In one aspect of the present invention, the liquid vehicle can comprise from about 70 wt % to about 99.9 wt % by weight of the ink-jet ink composition. In another aspect, other than the colorant, liquid vehicle can also carry polymeric binders, latex particulates, and/or other solids.

As described, co-solvents can be included in the ink-jet compositions of the present invention. Suitable co-solvents for use in the present invention include water soluble organic co-solvents, but are not limited to, aliphatic alcohols, aromatic alcohols, diols, glycol ethers, poly(glycol)ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink-jet to minimize clogging or optimize other properties of the ink such as viscosity, pH, surface tension, optical density, and print quality. The co-solvent concentration can range from about 0.1 wt % to about 40 wt %, and in one embodiment is from about 5 wt % to about 15 wt %. Multiple co-solvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the inkjet ink composition and often from about 0.1 wt % to about 0.25 wt %.

One or more of various surfactants can also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRITONS, MERPOLS, and combinations thereof. The amount of surfactant added to the ink-jet inks of this invention can range from 0 wt % to 10 wt %.

In one embodiment of the present invention, the ink-jet ink can be configured for application from a thermal ink-jet pen. Thermal ink-jet systems are quite different in their jetting properties than piezo ink-jet systems. As such, compositions that are effective for use in piezo ink-jet systems are not necessarily effective for use with thermal ink-jet ink systems. However, the converse is not necessarily true. In other words, polymers that work well with thermal ink-jet systems are more likely to work with piezo systems than vice versa. Therefore, the selection of liquid vehicle or other additives for use with thermal ink-jet systems often requires more care, as thermal ink-jet systems are less forgiving than piezo ink-jet systems.

Porous Coated Media

In accordance with one aspect of the present invention, systems and methods are provided that utilize a media substrate coated with an ink-receiving layer. The coated print media typically includes a substrate and a porous ink-receiving layer deposited on the substrate. The substrate can be paper, plastic, coated paper, fabric, art paper, or other known substrate used in the ink-jet printing arts. In one embodiment, photobase can be used as the substrate. Photobase is typically a three-layered system comprising a single layer of paper sandwiched by two polymeric layers, such as polyethylene layers.

With respect to the porous ink-receiving layer, inorganic semi-metal or metal oxide particulates, a polymeric binder, and optionally, mordants and/or other porous coating composition agents can be present. In one embodiment, the inorganic semi-metal or metal oxide particulates can be silica, alumina, boehmite, silicates (such as aluminum silicate, magnesium silicate, and the like), titania, zirconia, calcium carbonate, clays, and combinations thereof. In a more detailed aspect, the particulates can be alumina, silica, or aluminosilicate. Each of these inorganic particulates can be dispersed throughout a porous coating composition, which can be applied to a media substrate to form the porous ink-receiving layer. Typically, the inorganic particulates are present in the coating composition at from 60 wt % to 95 wt %. In a few specific embodiments, boehmite can be present in the coating composition at from 85 wt % to 95 wt %, or silica or silicates can be present in the coating composition at from 75 wt % to 85 wt %.

In order to bind the inorganic particulates together in the porous coating composition, a polymeric binder is typically included. Exemplary polymeric binders that can be used include polyvinyl alcohol including water-soluble copolymers thereof; polyvinyl acetate; polyvinyl pyrrolidone; modified starches including oxidized and etherified starches; water soluble cellulose derivatives including carboxymethyl cellulose, hydroxyethyl cellulose; polyacrylamide including its derivatives and copolymers; casein; gelatin; soybean protein; silyl-modified polyvinyl alcohol; conjugated diene copolymer latexes including maleic anhydride resin, styrene-butadiene copolymer, and the like; acrylic polymer latexes including polymers and copolymers of acrylic and methacrylic acids, and the like; vinyl polymer latexes including ethylene-vinyl acetate copolymers; functional group-modified latexes including those obtained by modifying the above-mentioned polymers with monomers containing functional groups (e.g. carboxyl, amino, amido, sulfo, etc.); aqueous binders of thermosetting resins including melamine resins, urea resin, and the like; synthetic resin binders including polymethyl methacrylate, polyurethane resin, polyester resin, amide resin, vinyl chloride-vinyl acetate copolymer, polyvinyl butyral, and alkyl resins. Such binder can be present to bind the porous ink-receiving layer together, but can also be present in small enough amounts to maintain the porous nature of the porous ink-receiving layer. In accordance with embodiments of the present invention, the polymeric binder can be present in the coating composition at from 5 wt % to 40 wt %. In specific embodiments where boehmite is used, the polymeric binder can be present at from 3 wt % to 15 wt %. Alternatively, where silica or silicates are used, the polymeric binder can be present at from 10 wt % to 25 wt %. In another specific embodiment, the binder can be polyvinyl alcohol or derivatives thereof.

Optionally, the porous ink-receiving layer can also be modified with an ionic binding species or mordant known to interact with a predetermined class of colorants, thereby increasing permanence. Typical mordants that can be included in the coating composition (and thus, included in the porous ink-receiving layer) include hydrophilic, water dispersible, or water soluble polymers having cationic groups (amino, tertiary amino, amidoamino, pyridine, imine, and the like). These cationically modified polymers can be compatible with water-soluble or water dispersible binders and have little or no adverse effect on image processing or colors present in the image. Suitable examples of such polymers include, but are not limited to, polyquaternary ammonium salts, cationic polyamines, polyamidins, cationic acrylic copolymers, guanidine-formaldehyde polymers, polydimethyl diallylammonium chloride, diacetone acrylamide-dimethyldiallyl ammonium chloride, polyethyleneimine, and a polyethyleneimine adduct with epichlorhydrin. Aside from mordants, other optional components that can be present in the porous ink-receiving layer can include anionic surfactants, cationic surfactants, biocides, plasticizers, optical brighteners, viscosity modifiers, leveling agents, UV absorbers, hindered amine stabilizers, anti-ozonants, silane coupling agents, and/or other known additives. In addition to these additives, the semi-metal oxide or metal oxide particulates can be chemically surface-modified using silane coupling agents having functional moieties attached thereto.

The ink-receiving layer can be a single layer or multilayer coating designed to absorb sufficient quantities of ink to produce high quality printed images. The coating composition may be applied to the media substrate to form the ink-receiving layer by any means known to one skilled in the art, including blade coating, air knife coating, rod coating, wire rod coating, roll coating, slot coating, slide hopper coating, gravure, curtain, and cascade coating. The ink-receiving layer can be printed on one or both sides of the media substrate. In one embodiment of the present invention, the depth of the ink-receiving layer formed by the coating composition can be from about 20 μm to about 60 μm. In accordance with a few specific embodiments, the thickness for boehmite-containing coating compositions can be from 40 μm to 55 μm, the thickness for silica- or silicate-containing coating compositions can be from 25 μm to 35 μm. If applied as a media topcoat, the thickness can range from 0.1 μm to 10 μm, and in a more specific embodiment, from 1 μm to 5 μm.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Ink-jet Ink Preparation

Several experimental and control ink-jet ink compositions were prepared according to the compositions listed in Table 1 below:

TABLE 1

| Ink-jet ink compositions | | |
|---|---|---|
| Components | Experimental Ink | Control Ink |
| [1]Metallized dye | 2 wt % | 2 wt % |
| Diethylene glycol | 10 wt % | 10 wt % |
| Triton X-100 | 1.5 wt % | 1.5 wt % |
| Trizma (Tris buffer) | 0.2 wt % | 0.2 wt % |
| [2]Amine additive | 2 wt % | — |
| Water | Balance | Balance |

[1]The metallized dyes included a copper phthalocyanine or a nickel phthalocyanine.
[2]The amine additives are listed in Tables 2-4 below.

Example 2

Evaluation of Ozone Fastness of Ink-jet Inks Printed on Porous Media

Various experimental ink-jet inks which included various metallized dyes and amine additives were compared to corresponding control ink-jet inks which did not contain the amine additive to determine the effectiveness of the amine additive on ozone fastness. Epson Premium Glossy Photo Paper was chosen as the porous media for these experiments. Printed samples at two levels of optical density (OD), 0.6 and 1.0, were evaluated. Each printed sample was placed in a chamber having a 1 ppm ozone level by volume, a relative humidity of 50%, and a temperature of 30° C. Failure of each printed sample was defined as 30% OD loss. The results are summarized in Tables 2 to 6 below with respect to different metallized and non-metallized dyes. A value of greater than 100 indicates improvement in ozone fastness, whereas a value at or less than 100 indicates that no improvement was achieved with respect to ozone fastness.

In Table 2, the ozone fastness was evaluated using a copper phthalocyanine dye, DB199 Na, with various amine additives. At both levels of optical density, i.e., 0.6 and 1.0, the amine compounds which showed effectiveness in improving the ozone fastness were triethylenediamine, N,N-diethylethylenediamine, homopiperazine, piperazine, piperidine, piperazine-2-carboxylic acid dihydrochloride, 4-piperidineethanol, 1-(2-hydroxyethyl)piperidine, and proton sponge (1,8-bis-[dimethylamino]naphthalene). Furthermore, the level of ozone fastness improvement increased at higher amine concentration for certain additives, as illustrated in the examples of piperazine. At a concentration of 0.1 wt % of piperazine, the ink-jet ink demonstrated improved ozone fastness comparing to that of the control ink. An even higher level of improvement was attained at the concentration of 1.0 wt %.

TABLE 2

| Ozone fastness improvement with copper phthalocyanine dye (DB199 Na) and amine additives | | |
|---|---|---|
| DB199Na (Copper phthalocyanine) | 0.6 Initial OD Time to Failure (% of control in ppm * hr) | 1.0 Initial OD Time to Failure (% of control in ppm * hr) |
| triethylenediamine | 118 (0.5 Initial OD) | 110 |
| N,N-diethylethylenediamine | 541 | 687 |
| homopiperazine | 423 | 568 |
| piperazine | 381 | 388 |
| piperidine | 174 | 149 |
| piperazine-2-carboxylic acid dihydrochloride | 150 | 119 |
| 4-piperidineethanol | 147 | 125 |
| 1-(2-hydroxyethyl) piperidine | 146 | 138 |
| proton sponge (1,8-bis-[dimethylamino] naphthalene) | 112 | 117 |
| N-(2-hydroxyethyl) piperazine-N'-(2 ethane sulfonic acid) sodium salt (HEPES) | 104 | 95 |
| 4-(2-hydroxyethyl) piperazine-1-propane sulfonic acid (EPPS) | 103 | 94 |
| Piperazine (1.0 wt %) | 338 | 352 |
| Piperazine (0.5 wt %) | 236 | 250 |
| Piperazine (0.2 wt %) | 160 | 136 |
| Piperazine (0.1 wt %) | 139 | 123 |

In Table 3 below, the ozone fastness was evaluated for a nickel phthalocyanine dye using various amine additives. At both levels of optical density, i.e. 0.6 and 1.0, piperidine was found to have significant improvement on ozone fastness comparing to that of the control ink.

TABLE 3

| Ozone fastness improvement with nickel phthalocyanine dye and amine additives | | |
|---|---|---|
| Nickel phthalocyanine tetrasulfonate | 0.6 Initial OD Time to Failure (% of control in ppm * hr) | 1.0 Initial OD Time to Failure (% of control in ppm * hr) |
| piperidine | 1128 (minimum) | 1786 (minimum) |
| piperazine | 94 | 89 |

As shown in Table 4 below, with a different copper phthalocyanine dye, Cyan 485, amine additives were also found to be effective in improving ozone fastness.

TABLE 4

Ozone fastness improvement with
copper phthalocyanine dye (Cyan 485) and amine additives

| Cyan 485<br>(Copper phthalocyanine) | 0.6 Initial OD<br>Time to Failure<br>(% of control in<br>ppm * hr) | 1.0 Initial OD<br>Time to Failure<br>(% of control<br>in ppm * hr) |
|---|---|---|
| piperidine | 125 | 107 |
| piperazine | 163 | 154 |
| diethylenetriamine | 118 | 105 |
| N-methyl-1,3-propanediamine | 124 | 100 |

As can be seen from Tables 2-4, many ink-jet inks showed an improvement in ozone fastness when the phthalocyanine metallized dye-containing ink-jet ink included an amine additive, particularly polyamines and heterocyclic amines that exclude oxygen within its ring structure, though other amines also can provide improvement in certain inks at certain concentrations. In further detail, heterocyclic amine additives (without oxygen within the ring) having saturated ring structures tended to generally performed better in the tested ink than unsaturated heterocyclic amine additives with respect to ozone fastness. Though the above tables tend to show positive results, it should be noted that some of amine additives can produce relatively neutral results to marginally negative results with respect to reducing ozone fade. Thus, though certain classes of materials have been discovered to reduce ozone fade in a general sense, this does not necessarily mean that each and every material in a particular class will be as effective as the materials tested in the above examples at every concentration within the presently disclosed ranges. Thus, to the extent that individual amine additives within these classes promote ozone fastness improvement in a given ink at a given concentration, they are included in accordance with embodiments of the present invention.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink composition, comprising:
a metallized phthalocyanine dye; and
a liquid vehicle carrying the dye, said liquid vehicle including a polyamine selected from the group consisting of N-methyl-1,3-propanediamine, 1,10-phenanthroline, diethylenetriamine, triethylenediamine, N,N-diethylethylenediamine, homopiperazine, piperazine, piperazine-2-carboxylic acid, 1,8-bis-[dimethylamino]naphthalene (proton sponge), N-(2-hydroxyethyl) piperazine-N'-(2-ethane sulfonic acid)(HEPES), 4-(2-hydroxyethyl) piperazine-1-propane sulfonic acid (EPPS), and combinations thereof, said polyamine present in the ink-jet ink at an effective concentration to cause improvement of ozone fastness of said ink-jet ink, wherein the improvement is determined by comparing the ozone fastness of the ink-jet ink with a control ink-jet ink that does not include the polyamine.

2. An ink-jet ink as in claim 1, wherein the polyamine is present in the ink-jet ink composition at from 0.01 wt % to 10 wt %.

3. An ink-jet ink as in claim 1, wherein the metallized phthalocyanine dye is present in the ink-jet ink composition at from 0.01 wt % to 10 wt %.

4. An ink-jet ink as in claim 1, wherein the polyamine is a piperazine.

5. An ink-jet ink as in claim 4, wherein the piperazine is a derivatized piperazine.

6. An ink-jet ink as in claim 1, wherein the metallized phthalocyanine dye is a nickel phthalocyanine dye.

7. An ink-jet ink as in claim 1, wherein the metallized phthalocyanine dye is a copper phthalocyanine dye.

8. An ink-jet ink as in claim 1, wherein the polyamine is molecularly associated with the metallized phthalocyanine dye in the ink-jet ink.

9. An ink-jet ink as in claim 1, wherein the polyamine is molecularly associated with the metallized phthalocyanine dye when the composition is printed onto a substrate.

10. An ink-jet ink as in claim 1, wherein the polyamine is molecularly associated with the metallized phthalocyanine dye in the form of a van der Waal force or ionic attraction.

11. A printing system for creating images with improved ozone fastness, comprising:
a) a printing medium including an ink-receiving layer coated thereon, said ink-receiving layer including semi-metal oxide or metal oxide particulates; and
b) an ink-jet ink configured for printing on printing medium, said ink-jet ink, comprising:
i) a metallized phthalocyanine dye; and
ii) a liquid vehicle carrying the dye, said liquid vehicle including a protonated amine being present in the ink-jet ink at an effective concentration to cause improvement of ozone fastness, wherein the dye and the protonated amine have a molecular association on the media, and wherein the improvement is determined by comparing the ozone fastness of the ink-jet ink with a control ink-jet ink that does not include the protonated amine.

12. A printing system as in claim 11, wherein the protonated amine is present in the ink-jet ink composition at from 0.01 wt % to 10 wt %, and the metallized phthalocyanine dye present the ink-jet composition at from 0.01 wt % to 10 wt %.

13. A printing system as in claim 11, the protonated amine is a polyamine.

14. A printing system as in claim 13, wherein the protonated amine is selected from the group consisting of N-methyl-1,3-propanediamine, 1,10-phenanthroline, diethylenetriamine, triethylenediamine, N,N-diethylethylenediamine, homopiperazine, piperazine, piperazine-2-carboxylic acid, 1,8-bis-[dimethylamino]naphthalene (proton sponge), N-(2-hydroxyethyl) piperazine-N'-(2 ethane sulfonic acid) (HEPES), 4-(2-hydroxyethyl)piperazine-1-propane sulfonic acid (EPPS), and combinations thereof.

15. A printing system as in claim 11, wherein the protonated amine is a heterocyclic amine which does not include oxygen within its ring structure.

16. A printing system as in claim 15, wherein the heterocyclic amino is selected from the group consisting of piperidine, 4-piperidineethanol, 1-(2-hydroxyethyl)piperidine, and combinations thereof.

17. A printing system as in claim 11, wherein the metallized phthalocyanine dye is a nickel phthalocyanine dye.

18. A printing system as in claim 11, wherein the metallized phthalocyanine dye is a copper phthalocyanine dye.

19. A printing system as in claim 11, wherein the protonated amine is molecularly associated with the metellized phthalocyanine dye in the ink-jet ink.

20. A printing system as in claim 11, wherein the protonated amine is molecularly associated with the metallized phthalocyanine dye when the composition is printed onto a substrate.

21. A printing system as in claim 11, wherein the semi-metal oxide or metal oxide particulates are selected from the group consisting of silica, alumina, boehmite, silicates, titania, zirconia, calcium carbonate, clays, and combinations thereof.

22. A method for printing images with improved ozone fastness, comprising jetting an ink-jet ink onto a printing medium, said printing medium including an ink-receiving layer coated thereon, said ink-receiving layer comprising semi-metal oxide or metal oxide particulates, said ink-jet ink comprising a metallized phthalocyanine dye, and a liquid vehicle carrying the dye, said liquid vehicle including a protonated amine being present in the ink-jet ink at an effective concentration to cause improvement of ozone fastness, wherein the improvement is determined by comparing the ozone fastness of the ink-jet ink with a control ink-jet ink that does not include the protonated amine.

23. A method as in claim 22, wherein the protonated amine is present in the ink-jet ink composition at from 0.01 wt % to 10 wt %, and wherein the metallized phthalocyanine dye is present in the ink-jet ink composition at from 0.01 wt % to 10 wt %.

24. A method as in claim 22, wherein the protonated amine is a polyamine.

25. A method as in claim 22, wherein the protonated amine is a heterocyclic amine which does not include oxygen within its ring structure.

26. A method as in claim 22, wherein the metallized phthalocyanine dye is a nickel or copper phthalocyanine dye.

27. A method as in claim 22, wherein the semi-metal oxide or metal oxide particulates are selected from the group consisting of silica, alumina, boehmite, silicates, titania, zirconia, calcium carbonate, clays, and combinations thereof.

28. A method as in claim 22, wherein the jetting step is by a thermal ink-jetting process.

29. An ink-jet ink composition, comprising:
a metallized phthalocyanine dye; and
a liquid vehicle carrying the dye, said liquid vehicle including a heterocyclic amine selected from the group consisting of piperidine, 4-piperidineethanol, 1-(2-hydroxyethyl)piperidine, and combinations thereof, said heterocyclic amine present in the ink-jet ink at an effective concentration to cause improvement of ozone fastness of said ink-jet ink,
wherein the improvement is determined by comparing the ozone fastness of the ink-jet ink with a control ink-jet ink that does not include the heterocyclic amine.

30. An ink-jet ink as in claim 29, wherein the heterocyclic amine is selected from the group consisting of 4-piperidineethanol, 1-(2-hydroxyethyl)piperidine, and combinations thereof.

31. An ink-jet ink as in claim 29, wherein the heterocyclic amine is a piperidine.

32. An ink-jet ink as in claim 29, wherein the heterocyclic amine is present in the ink-jet ink composition at from 0.01 wt % to 10 wt %.

33. An ink-jet ink as in claim 29, wherein the metallized phthalocyanine dye is present in the ink-jet ink composition at from 0.01 wt % to 10 wt %.

34. An ink-jet ink as in claim 29, wherein the metallized phthalocyanine dye is a nickel phthalocyanine dye.

35. An ink-jet ink as in claim 29, wherein the metallized phthalocyanine dye is a copper phthalocyanine dye.

36. An ink-jet ink as in claim 29, wherein the heterocyclic amine is molecularly associated with the metallized phthalocyanine dye in the ink-jet ink.

37. An ink-jet ink as in claim 29, wherein the heterocyclic amine is molecularly associated with the metallized phthalocyanine dye when the composition is printed onto a substrate.

38. An ink-jet ink as in claim 29, wherein the heterocyclic amine is molecularly associated with the metallized phthalocyanine dye in the form of a van der Waal force or ionic attraction.

* * * * *

UNITED STATES PATENT AND TRADEMARK OFFICE
CERTIFICATE OF CORRECTION

| | | |
|---|---|---|
| PATENT NO. | : 7,435,291 B2 | Page 1 of 1 |
| APPLICATION NO. | : 11/080209 | |
| DATED | : October 14, 2008 | |
| INVENTOR(S) | : John R. Moffatt et al. | |

It is certified that error appears in the above-identified patent and that said Letters Patent is hereby corrected as shown below:

Title Page, delete "(76)" and insert -- (75) --.

Title Page after (76), insert -- (73) Assignee:
Hewlett-Packard Development Company, L.P., Houston, Texas (US) --.

In column 5, line 9, after "heterocyclic" delete "mines" and insert -- amines --, therefor.

In column 12, line 40, in Claim 12, after "dye" insert -- is --.

In column 12, line 41, in Claim 12, after "present" insert -- in --.

In column 12, line 41, in Claim 12, after "ink-jet" insert -- ink --.

In column 12, line 57, in Claim 16, after "cyclic" delete "amino" and insert -- amine --, therefor.

Signed and Sealed this

Twenty-second Day of June, 2010

David J. Kappos
*Director of the United States Patent and Trademark Office*